US007527136B2

(12) United States Patent
Gierling

(10) Patent No.: US 7,527,136 B2
(45) Date of Patent: May 5, 2009

(54) ACTUATING ARRANGEMENT IN A TRANSMISSION FOR TWO PRESSURE MEDIUM-ACTUATABLE SHIFT ELEMENTS

(75) Inventor: Armin Gierling, Langenargen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 317 days.

(21) Appl. No.: 10/577,210

(22) PCT Filed: Oct. 2, 2004

(86) PCT No.: PCT/EP2004/011030

§ 371 (c)(1),
(2), (4) Date: Apr. 27, 2006

(87) PCT Pub. No.: WO2005/047739

PCT Pub. Date: May 26, 2005

(65) Prior Publication Data

US 2007/0062778 A1 Mar. 22, 2007

(30) Foreign Application Priority Data

Oct. 30, 2003 (DE) ................................ 103 50 759

(51) Int. Cl.
*F16D 25/10* (2006.01)
*F16H 63/30* (2006.01)
*F16D 25/0638* (2006.01)

(52) U.S. Cl. .............. 192/87.11; 192/70.12; 192/106 F

(58) Field of Classification Search .............. 192/87.11, 192/87.14, 87.15
See application file for complete search history.

(56) References Cited

U.S. PATENT DOCUMENTS

| | | | | |
|---|---|---|---|---|
| 3,365,985 | A | 1/1968 | Johnson | |
| 3,823,802 | A | 7/1974 | Winzeler et al. | |
| 5,913,397 | A * | 6/1999 | Okada et al. | 192/87.15 |
| 6,468,177 | B2 | 10/2002 | Park | |
| 6,929,107 | B2 | 8/2005 | Hegerath | |
| 2003/0087720 | A1 | 5/2003 | Lepelletier | |
| 2004/0206599 | A1 * | 10/2004 | Hegerath | 192/87.11 |
| 2005/0284723 | A1 * | 12/2005 | Zagrodzki et al. | 192/85 AA |

FOREIGN PATENT DOCUMENTS

DE 91 14 528 U 3/1992

* cited by examiner

*Primary Examiner*—Rodney H Bonck
(74) *Attorney, Agent, or Firm*—Davis & Bujold, P.L.L.C.

(57) ABSTRACT

An activation assembly in a transmission for two pressure-activated friction shifting elements positioned immediately behind each other axially, basically on the same radial transmission diameter and are constructed as a disc coupling or a disc brake, each of which is associated with its own servo device. To activate the two shifting elements separately and independent of the pressure, the inner discs (10, 11) of both friction shifting elements are positioned on a common inner disc carrier (16), the inner disc carrier (16) has, with respect to its cross-sectional geometry, a pot axially opened on one side, and the two servo devices are located radially within the pot space (27) formed by the pot-shaped inner disc carrier (16) as well as axially next to each other and basically radially below both disc packets (8, 9) of the friction shifting elements.

26 Claims, 3 Drawing Sheets

ACTUATING ARRANGEMENT IN A TRANSMISSION FOR TWO PRESSURE MEDIUM-ACTUATABLE SHIFT ELEMENTS

This application is a national stage completion of PCT/EP20042004/011030 filed Oct. 2, 2004 which claims priority from German Patent Application Serial No. 103 50 759.0 filed Oct. 30, 2003.

FILED OF THE INVENTION

The invention involves an activation assembly in a transmission for two pressure-activated shifting elements.

BACKGROUND OF THE INVENTION

A step automatic transmission is known from US 2003/0087720 A1 with a planetary set and pressure-activated transmission shifting elements. The transmission shifting elements are constructed as two switchable couplings which use a common outer disc carrier to accept the outer discs of the couplings. The common outer disc carrier shows a pot-shaped, half cross-sectional geometry whose symmetry axis coincides with the long axis of the transmission input shaft. As a result, the outer disc carrier forms a coupling area within which the disc packet and the servo device of both couplings are positioned.

The two disc packets of the mentioned couplings, which will be examined more closely here, are positioned immediately next to each other in an axial and radial direction. In addition, the servo devices act in such a way on both coupling packets, that the closing direction of both couplings is equal and points away from the pot base of the outer disc carrier. For that reason, the pressure areas of both servo devices are axially directly next to each other.

The piston of the servo device which activates the second disc packet located away from the pot base is axially located between the pistons of the servo device to activate the first disc coupling near the pot base, as well as the pot base of the outer disc carrier. In addition, the piston to activate the first disc packet near the pot base is positioned between the piston for the second disc packet away from the pot base and the disc packet near the pot base.

It should also be noted, that the inner discs of both couplings of this known automatic transmission are carried by two separate inner disc carriers.

By means of this, construction results that the piston to activate the second disc packet away from the pot base axially separates the two pressure areas of both servo devices.

Another characteristic of the transmission is that only the servo device to activate the first disc packet near the pot base is associated with a space for a dynamic, activation pressure compensation. In the process, the mentioned piston which activates the first disc packet near the pot base separates the pressure area for this piston as well as the pressure compensation area axially from each other.

In this transmission the fact that the pressure in the pressure area of the servo device to activate the first coupling near the pot base influences the pressure in the pressure area of the servo device to activate the second coupling away from the pot base and vice versa can be viewed as disadvantageous.

In addition, the fact that the piston must activate the second coupling away from the pot base axially penetrating the outer discs of the first coupling can be viewed as expensive to build, away from the pot base. For that reason, the outer discs of the first coupling near the pot base are equipped with axial penetration openings in the area of their outer diameter through which the mentioned piston is guided. Moreover the outer discs of the first disc coupling must be built comparatively long in a radial direction which then results in an enlarged diameter for the transmission.

SUMMARY OF THE INVENTION

Based on this, the task of the invention is to present an alternative construction for an activation assembly with two shifting elements of the mentioned type. In a development from the mentioned state of technology the two shifting elements of the transmission should thereby be able to be activated separately and independent of the pressure.

The invention proceeds from the knowledge, that the task posed can be solved, that if based on the known state of technology for an activation assembly of this type, a common inner disc carrier axially bears disc friction shifting elements immediately adjacent to the inner discs.

Accordingly, the invention involves an activation assembly in a step automatic transmission for two pressure-activated friction shifting elements positioned immediately behind each other axially and basically on the same radial transmission diameter, each of which is associated with its own servo device.

This activation assembly is also characterized by the shifting elements being constructed as disc couplings or disc brakes whose inner discs and outer discs are secured to disc carriers, by the inner discs of both disc couplings or disc brakes being positioned on a common inner disc carrier, by the inner disc carrier being constructed with respect to its cross-sectional geometry as a pot axially opened on one side, and by both servo devices being radially positioned at least primarily within the pot area formed by the pot-shaped inner disc carrier, as well as at least partially next to each other axially and being basically positioned radially below the disc packet of both shifting elements.

Other component parts of the invention are realized in conjunction with the first variation of the invention. In this first variation it is envisioned that both shifting elements are constructed as disc couplings whose common inner disc carrier shows in the area axially between the two disc packets openings radially distributed around the circumference.

It is advantageous in this regard, that the first servo device, near the pot base, to activate the first disc coupling near the pot base shows an axially movable piston on which several radially aligned fingers are distributed on the circumference which are connected with their radial inner ends to the piston and act with their radial outer ends on the disc packet of the first disc coupling near the pot base. In the process the fingers of the piston of the first servo device near the pot base penetrates the mentioned radial openings of the common inner disc carrier in a radial direction.

It is also advantageous, that the second servo device away from the pot base to activate the second disc coupling away from the pot base has an axially movable piston, on which a radially aligned, ring-shaped pressure plate is constructed that is connected to the piston with its radial, inner diameter and acts with its radial outer diameter on the disc packet of the second disc coupling away from the pot base. In the process, the pressure plate of the piston of the second servo device away from the pot base bears the common inner disc carrier at its axially open end in a radial and axial direction. Instead of the mentioned, ring-shaped pressure plate of the piston of the second servo device away from the pot base there can be several radially aligned fingers also distributed across the circumference which are then connected with their radial inner ends to the piston and act with their radial outer ends on the disc packet of the first disc coupling near the pot base.

This construction of the activation assembly enables both pistons to move individually and parallel to the axis in the direction of the pot base of the inner disc carrier upon a pressure impact on the pressure areas of both servo devices for a separate closing of both disc couplings.

In the process, there follows in this first variation the closing of both disc couplings in the same axial direction.

For a further improvement of such an already functional activation assembly for two disc couplings of the type mentioned, it can be provided in another variation of the invention, that an axially adjacent, pressure compensation area for dynamic activation pressure compensation is provided for each servo device.

Moreover there can be a design on which the pressure compensation area associated with the first piston is near the pot base borders axially on the pot base of the inner disc carrier, while the pressure compensation area associated with the second piston away from the pot base is axially positioned between the first piston and the second piston away from the pot base.

In addition, the pressure compensation area associated with the first piston can be placed axially to the right or left of the pressure area for the first piston near the pot base. Accordingly it can be provided, that the pressure compensation area associated with the second piston can be positioned to the axial left or right of the pressure area for the second piston away from the pot base.

Another version of the activation assembly constructed according to the first variation of the invention envisions that the cooling oil from the pressure compensation areas can flow to the discs of both disc packets via flow lines which are basically located between the radial outer side of the pressure compensation areas as well as the radial inner side of the inner disc carrier and lead to them through radial openings in the common inner disc carrier underneath the inner discs.

A second construction variation of the activation assembly of the invention for two disc couplings positioned next to each other envisions that the servo device to activate the first disc packet near the pot base borders the pot base of the common inner disc carrier and is placed, at least for the most part, radially below the first disc packets near the pot, as well as in part radially below the second disc packet away from the pot base.

In a further development of this second variation there can be the provision that the inner discs of the second disc packet away from the pot base show axial openings distributed around the circumference. Alternatively or in addition thereto, the common inner disc carrier can have axially aligned recesses on its radial outer side in the area of the second disc packet away from the pot base.

The openings in the inner discs and the recesses in the common inner disc carrier are distributed on the perimeter and show an equal, axial alignment and each forms a penetration area for an axial section of the piston of the servo device near the pot base which is constructed radially above the common inner disc carrier.

An axial section of an axially movable piston of the first servo device near the pot base can be guided through these openings and/or recesses.

In the process the openings and/or recesses can be constructed as interruptions of the disc entrainment profile on the inner disc carrier and, in addition, correspondingly on the inner discs of the second disc packet away from the pot base.

Moreover, a component part of this second variation of the activation assembly of the invention is that the first servo device near the pot base to activate the first disc packet away from the pot base shows an axially movable piston which axially and radially bears the common inner disc carrier on its open top side by means of an axially and radially aligned, ring or cylinder-shaped, pressure plate and axially aligned fingers which are action-linked to the pressure plate. This pressure plate is thereby connected at its interior diameter with the first piston near the pot base. The fingers placed on the circumference extend axially outward from the outer diameter of this pressure plate in the direction of the first disc packet near the pot base and thereby penetrate the openings in the inner discs of the of the inner discs away from the pot base and/or the recesses in the common inner disc carrier basically in an axial direction to the pot base. Upon an impact of pressure from the pressure area of this servo device near the pot base the pressure plate presses axially across the mentioned fingers to the first disc packet near the pot base.

In this regard it is viewed as advantageous if the fingers associated with the first coupling near the pot base are rigidly connected with the pressure plate of the servo device near the pot base. However it can also occur that the mentioned fingers are constructed as separate components which then are inserted in a removable and axially movable way into the opening provided in the inner discs of the inner discs away from the pot base and/or in the recesses provided in the common inner disc carrier. In another alternative model it can also be provided that instead of the pressure plate of the first servo device near the pot base and the fingers axially connecting to this pressure plate, only several fingers distributed around the circumference are used which show the shape of a "reclining U" and axially and radially bear the common inner disc carrier on its open topside. The radial internal finger end is then also connected with the piston near the pot base, whereby the radial outer end correspondingly acts on the disc packet near the pot base.

In addition, it is viewed as making sense in this regard, if the second servo device away from the pot base axially borders the first servo device near the pot base and at least in part is radially below the second disc packet away from the base as well as at least in part being positioned radially below an axial section of the piston of the first servo device near the pot base.

To activate the second disc coupling away from the pot base, it is envisioned that the second servo device possess an axially movable piston which bears in a radial and axial direction the common inner disc carrier as well as the piston of the first servo device together with the pressure plate outside the pot area and upon a pressure impact of the pressure area this second servo device away from the pot base presses axially on the second disc packet away from the pot base. As a result there also follows in this second embodiment the closing of both disc couplings in the same axial direction.

In a third construction embodiment of the activation assembly of the invention it is provided, that the closing directions of both shifting elements each constructed as a disc coupling are in opposite directions to each other.

In another further development of this third embodiment, it is advantageous if the first disc coupling near the pot base is closed by a pulling activation of the piston of the first servo device near the pot base in the direction toward the pot base, while the second disc coupling away from the pot base is closed by a pressing activation of the piston of the second servo device away from the pot base.

Moreover, it makes sense if the first servo device near the pot base to activate the first disc packet near the pot base is adjacent to the pot base of the common inner disc carrier.

An especially compact construction of the activation assembly results if the second servo device away from the pot base to activate the second disc packet away from the pot base is adjacent to the first servo device near the pot base and is radially positioned at least in part underneath the second disc packet away from the pot base.

Another element of the third embodiment is that the common inner disc carrier manifests in the axial area between the two disc packets radial openings distributed on the circumference and that the two pistons are positioned directly behind each other in an axial direction.

In addition, the two pistons show radial fingers on their outer diameter which are distributed axially behind each other on the circumference or are positioned in the same axial plane of the transmission and penetrate the common inner disc carrier in the associated radial openings.

The radial outer (free) ends of the fingers of the first servo device near the pot base press upon impact by pressure of the pressure area of this first servo device axially in the direction to the pot base and on the disc packet of the first disc packet near the pot base, while the radial outer (free) ends of the fingers of the second servo device away from the pot base press upon a pressure impact of the pressure area of this servo device axially away from the pot base and on the disc packet of the second disc packet away from the pot base.

Another development of this third embodiment envisions that the pressure compensation area of the first disc coupling near the pot base borders radially below the same and immediately at the pot base of the inner disc carrier as well as a flow line for the cooling oil is formed which leads from this pressure compensation area through radial openings in the inner disc carrier to the discs of the first disc packet near the pot base.

The invention envisions a similar construction of the pressure compensation area of the second disc coupling away from the pot base, whereby it is positioned radially below it and distant from the pot base of the inner disc carrier. Moreover, a flow line for cooling oil is provided which leads from the pressure compensation area across radial openings in the inner disc carrier to the discs of the second disc packet away from the pot base.

In the process it is possible that the pressure compensation area of the first disc coupling near the pot base is positioned left or right of the pressure area for the piston of the first servo device. Thus it can occur, that the pressure compensation area of the second disc coupling away from the pot base is positioned axially directly next to the pressure area of the servo device to activate the first disc coupling near the pot base.

Accordingly, it can be envisioned that the pressure compensation area of the second disc coupling away from the pot base is constructed to the axial left or right of the pressure area of the servo device for the second disc coupling.

Finally, it is possible, that the pressure compensation area of the second disc coupling away from the pot base is positioned in the area of the axial edge of the inner disc carrier away from the pot base.

With regard to all three constructive embodiments of an activation assembly according to the invention, it can make sense for special types of transmission construction that the supply of cooling oil to at least one of the two disc packets occur via a special supply line which does not lead radially through the common inner disc carrier.

It should finally be noted here, that the radial openings to accept the piston fingers in the common inner disc carrier are longer in an axial direction than the axial extent of the piston fingers in this area plus the air gap of the disc packet of each associated disc coupling.

Finally it can be viewed as advantageous if the inner discs of the disc couplings are constructed as lining discs.

As a difference from the previously introduced shifting element constructions, it can be seen, that at least one of the two shifting elements is constructed as a gear brake. If only one of the two shifting elements is designed as a disc brake, then its outer disc carrier is connected in a torque-proof way with the transmission housing. If both shifting elements are designed as disc brakes, then either their common inner disc carrier is connected in a torque-proof way with the transmission housing or both outer disc carriers of the disc carriers are connected in a torque-proof way with the transmission housing.

BRIEF DESCRIPTION OF THE DRAWINGS

The principle of the invention will now be described, by way of example, with reference to the accompanying drawings in which.

DETAILED DESCRIPTION OF THE PREFERRED EMBODIMENTS

Figure 1:
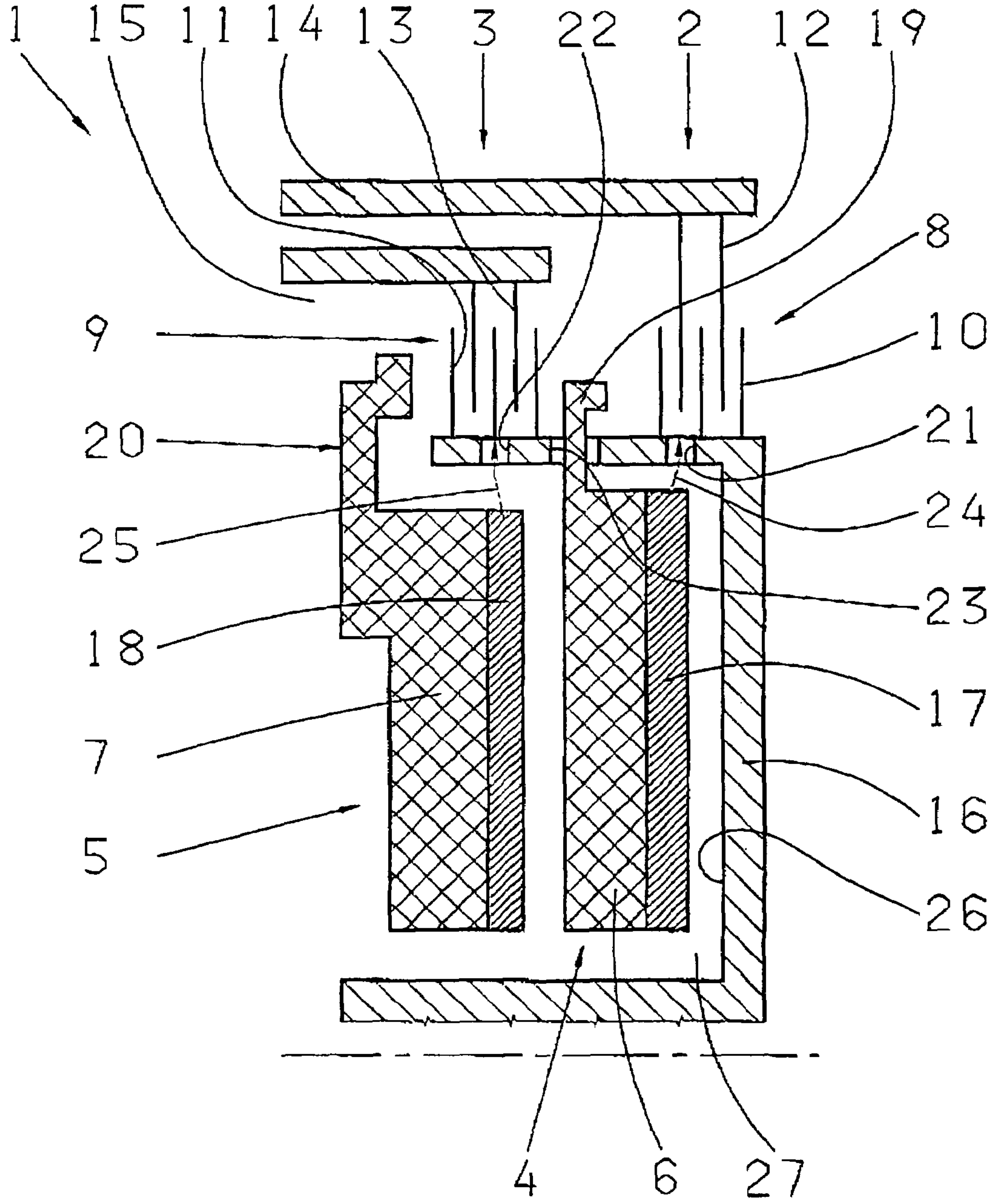
FIG. 1 is a schematic semi-cross section through two disc couplings of a transmission placed axially behind each other as well as the associated activation assemblies.

As can be seen in FIG. 1, the first embodiment of an activation assembly 1 constructed according to the invention initially includes two transmission shifting members constructed, for example, as disc couplings 2, 3 whose outer discs 12, 13 are each rigidly connected to an outer disc carrier that is individual for each coupling 14, 15. These outer disc carriers 14, 15 are action-linked with other components of the automatic transmission, which are not shown here, so that, as is known for US 2003/0087720 A1 which was mentioned at the outset, different transmission translation stages can be obtained by the activation of at least the two disc couplings 2, 3.

In addition, inner discs 10 and 11 belong to each of these disc couplings 2, 3 which are alternately positioned in a torque-proof way on the mentioned outer discs 12 and 13 and axially movable on a common inner disc carrier 16 for both disc couplings 2, 3. This inner disc carrier 16 likewise has an interaction with at least one additional transmission component part not depicted here.

With this construction each of the disc couplings 2, 3 has a disc packet 8 or 9 on which the inner discs 10, 11 are preferably constructed as lining discs.

In addition it should also be pointed out that the common inner disc carrier 16 shows an approximate pot-shaped cross section geometry whose pot base 26 is formed by a radial section of the inner disc carrier 16. That is, the radial pot base (26) and a common annular surface, connected with a periphery of the pot base (26), form a pot-shaped structure which is axially opened on one end. As a result a so-called pot space 27 is formed by the inner disc carrier 16 which is open on its axial side.

Figure 2:
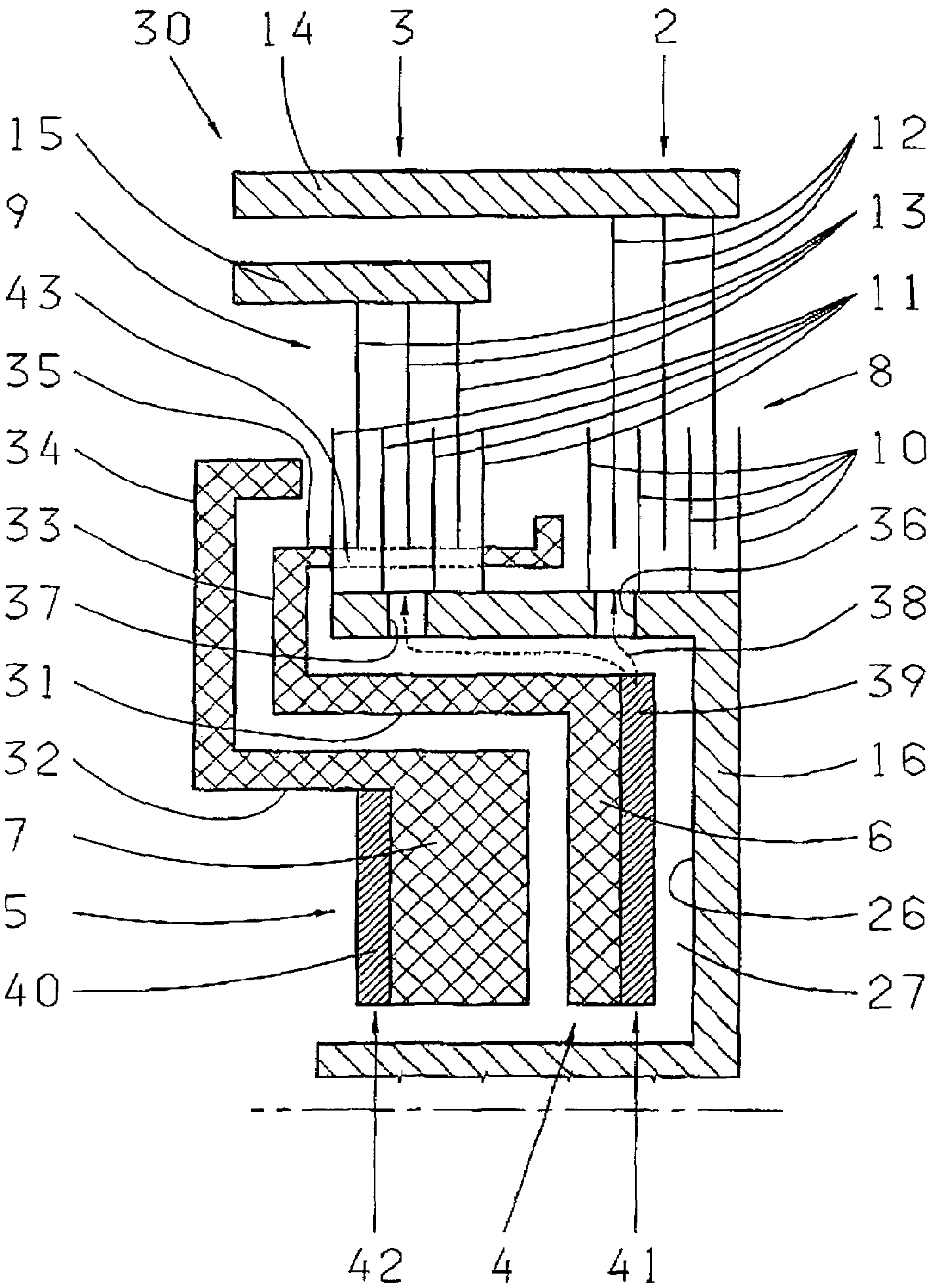
FIG. 2 is a depiction like FIG. 1 but with another activation assembly.
Figure 3:
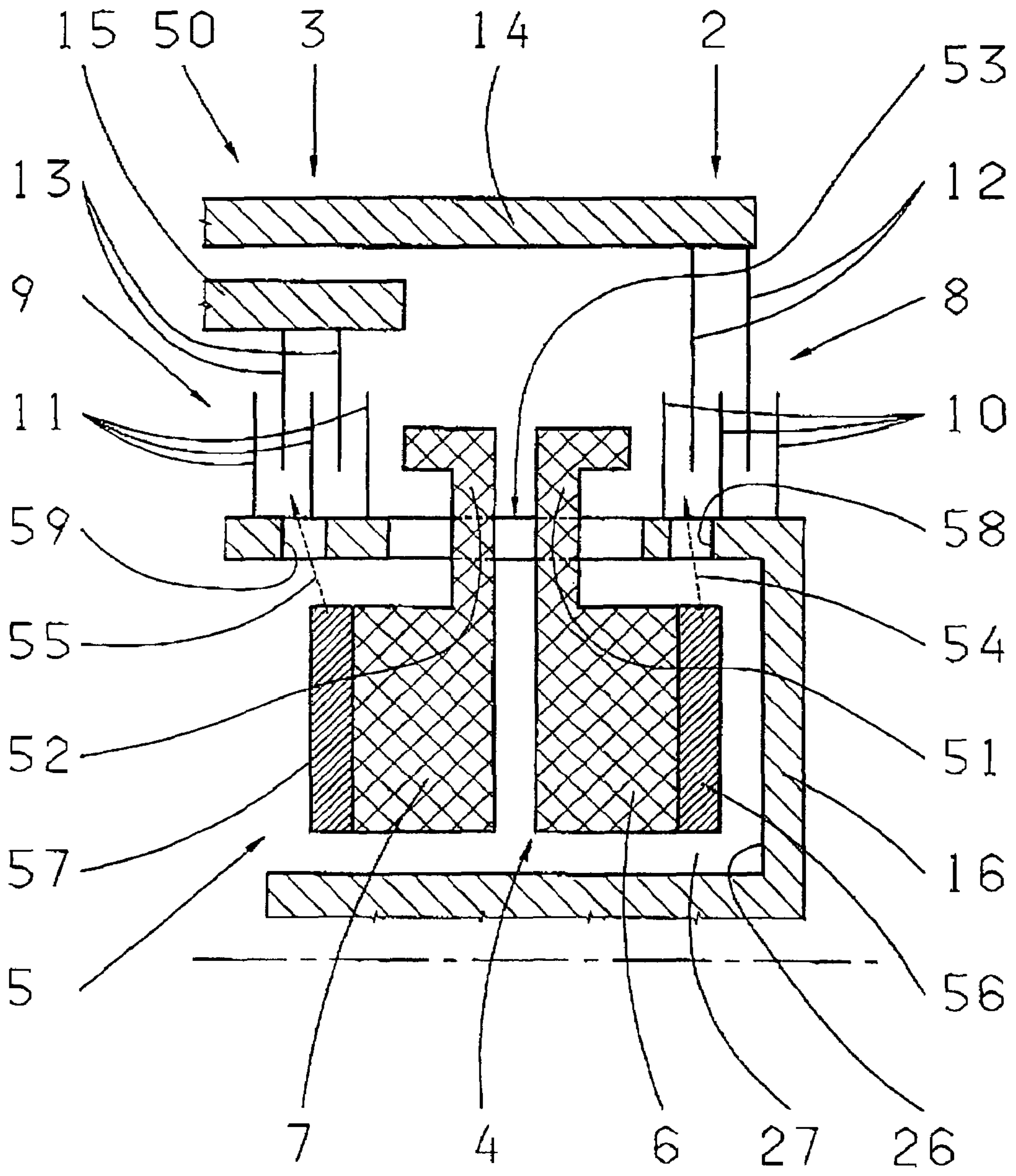
FIG. 3 is a depiction like FIG. 1 but with a third activation assembly.

A suitable servo device 4, 5 is associated with the transmission shifting elements constructed as disc couplings 2, 3 according to FIG. 1 to FIG. 3. These servo devices 4, 5 each bear both a pressure area for a preferably hydraulic means and a piston 6, 7, whereby the latter are positioned to move axially in the pot space 27. The pot space 27 formed by the common inner disc carrier 16 is therefore used as a cylinder for the pistons 6, 7 of both servo devices.

As it can be seen in FIG. 1, the pressure compensation areas 17, 18 for a known dynamic activation pressure compensation are associated with the two pistons 6, 7 which are filled via a common or separate supply lines with preferably a cooling oil. This cooling oil can exit at each radial end of the pressure compensation areas 17, 18 and move via supply lines 24, 25 and the radial openings 21, 22 in the common disc carrier 16 to the disc packets 8, 9 of the two disc couplings 2, 3.

The activation assembly 1 shown in FIG. 1 is characterized by a comparatively simple and axially short method of construction. That is basically achieved by several radial fingers 19 being constructed on the circumference on the piston 6 of the first servo device 4 near the pot base 26 which penetrate the radial openings or recesses 23 positioned on the circumference in the common disc carrier 16. These recesses 23 are positioned between the first disc packet 8 near the pot base and the second disc packet 9 away from the pot base. A finger 19 is associated with each of these recesses 23.

The fingers 19 of the first piston 6 show an active surface at its radial outer end which axially is aimed toward the disc packet 8 near the pot base. Upon activation of the first servo device 4 near the pot base the piston 6 is moved, so to speak, in a pulling way parallel to the axis in the direction toward the pot base 26, so that the mentioned fingers 19 press together the discs 11, 12 of the first disc packet 8 close the disc coupling 2.

To close the second disc coupling 3 near the pot base, the piston 7 of the second servo device 5 away from the pot base has a basically radially aligned, ring-shaped pressure plate 20 which radially and axially bears the axial open end of the inner disc carrier 16 away from the pot base. This pressure plate 20 is connected at its inner diameter with the piston 7. At its outer diameter the pressure plate 20 shows an action area which axially is aimed toward the second disc packet 9 away from the pot base. A pressure impact of the second piston 7 away from the pot base results in a piston and pressure plate movement parallel to the axis in the direction toward the pot base 26, as well as a closing of the second coupling 3 away from the pot base.

To simplify the depiction, an exact description of the pressure areas to activate the pistons 6, 7 of both servo devices 4, 5 in FIGS. 1 to 3 is not shown in detail. Since the two pistons 6, 7 can be activated independent of each other and without the influence of pressure by the other servo device, it makes sense, that the mentioned pressure areas are located on the side of the pistons 6, 7 away from the pressure compensating area. In addition, it should be envisioned that between the two pressure areas or a pressure area and an adjacent pressure compensating area there is located a pressure-separating wall.

FIG. 2 shows a second, concrete, constructive embodiment of the invention. In this activation assembly 30 the construction of the outer disc carrier 14 and 15 as well as the common inner disc carrier 16 with the inner discs 10, 11 and the outer discs 12, 13 attached thereto is largely identical to the embodiment of FIG. 1. In addition, in this activation assembly 30, in which two servo devices 4, 5 are built into the pot space 27 formed by the inner disc carrier 16, the previous construction characteristics for the pressure areas, the pistons 6, 7 and the pressure compensation areas 39, 40 also largely apply.

A difference from the construction of FIG. 1 involves the cooling oil supply for the two disc packets 8, 9 of the two couplings 2, 3 occurring here by means of a largely common supply line 38 which begins at a cooling oil exit opening at the radial end of the pressure compensation area 39 near the pot base and then leads through the radial cooling oil passage openings 36, 37 associated with the disc packets 8, 9.

Another peculiarity of this activation assembly 30 involves both pistons 6 and 7 which each show axial sections 31, 32 positioned largely in the pot space 27 on whose ends away from the pot base ring-shaped pressure plate 33, 34 are constructed. Starting at the end away from the pot base of each axial piston section 31, 32, these pressure plates 33, 34 extend radially outward up to the area of the radial extension of both disc packets 8, 9. The axial sections 31, 32 of the pistons 6, 7 can also be interpreted as parts of the pressure plates 33, 34. Depending on the geometric construction of the pistons, the mentioned axial sections 31, 32 can also be omitted, whereby the mentioned pressure plates 33, 34 then connect directly at the outer diameter of the pistons 6, 7. In an alternative construction method the pressure plates 33, 34 can be replaced by several radial fingers positioned so as to be distributed on the circumference.

The axially aligned fingers, which are located radially above the common disc carrier 16 and which are basically aligned parallel to the axis in the direction back to the pot base 26, are constructed on the outer diameter of the pressure plate 33 of the first piston 6 near the pot base. The axially aligned fingers 35 thereby penetrate the axial openings 43 in the inner discs 11 of the disc packet 9 away from the pot base and/or the axial recesses on the radial outer side of the inner disc carrier 16 in the area of this disc packet 9.

These openings 43 in the inner discs 11 and these recesses in the inner disc carrier 16 are axially aligned equally on the circumference and thus form a passage area though which one of the axially aligned fingers 35 can be guided that are associated with the piston 6 of the servo device 4 of the first disc coupling 2 near the pot base.

At the (free) ends near the pot base the axial fingers 35 show an action area which upon a pressure impact of the piston 6 near the pot base press together the discs 10, 12 of the first disc packet 8 near the pot base pulling, so to speak, parallel to the axis in the direction toward the pot base 26. In order to achieve as even a pressure distribution as possible, when viewed in the direction of the circumference, upon the activation of the disc packet 8 of the first disc coupling 2, several of these axial fingers 35 are provided which are positioned around the circumference in a symmetrical circular distribution, which penetrate the openings 43 in the inner discs 11 of the second (away from the pot base) disc coupling 3 and/or the axial recesses in the common inner disc carrier 16 basically in an axial direction to the pot base 26 and all act with their pot base side ends on the disc packet 8 of the first (near the pot base) disc coupling (2).

In can be provided in construction, for example, that the openings 43 and/or the axially aligned recesses in the inner disc carrier 16, when viewed in the direction of the circumference, can be constructed as an interruption of the disc entrainment profile on the inner disc carrier 16 and correspondingly on the inner discs 11 of the second disc packet 9 away from the pot base.

Along the course of its radial extent the pressure plate 34 of the second piston 7 away from the pot base radially and axially bears the disc-shaped pressure plate 33 of the first piston 6 near the pot base outside the pot space 27 of the inner disc carrier 16. In the area of its outer diameter and at its side facing the pot base 26 the pressure plate 34 thereby shows a free action area which faces the discs of the second disc packet 9 near the pot base. Upon a pressure impact of the second piston 7 away from the pot base this piston 7 moves together with the pressure plate 34, so to speak, pulling parallel to the axis in the direction of the pot base 26, whereupon the disc packet 9 away from the pot base is closed.

As also shown in the execution model in FIG. 2 here the pressure compensation areas 39, 40 are placed to the right or left of the associated piston 6 or 7. The supply of the cooling means—preferably cooling oil—occurs in these two pressure compensation areas 39, 40 via separate supply lines 41, 42 depicted here in a simplified form, even if one common supply line for both pressure compensation areas 39, 40 is possible.

Even in a third embodiment of an activation assembly 50 constructed according to the invention, the outer disc carriers 14 and 15, the outer discs 12 and 13 secured to them, the common inner disc carrier 16 for both disc couplings 2, 3 with the associated inner discs 10 and 11, and the two servo devices 4, 5 are basically constructed the same or arranged like the two activation assemblies 1 and 30 in FIG. 1 and FIG. 2.

While in the two embodiments already introduced the closing direction of the disc couplings points in the same direction, namely parallel to the axis in basically the direction to the pot base 26, the pistons 6, 7 of the activation assembly 50 shown in FIG. 3 act in opposite directions.

Therefore several radially aligned fingers 51, 52 distributed on the circumference are constructed on each of the two pistons 6, 7 which radially penetrate radial openings 53 on the common inner disc carrier 16. These openings 53 in the outer diameter of the inner disc carrier 16 are also positioned in a distributed way on the circumference. A finger 51 and a finger 52 are appropriately associated with each of these openings 53. At their radial, inner ends, but still within the pot space 27, these fingers 51, 52 are connected with the associated pistons 6, 7. On their radial outer ends these fingers 51, 52 show at any given time on one of the two disc packets 8, 9 free actions areas which, however, point in opposite directions (pointing parallel to the axis to the pot base 26 or pointing away from this pot base 26).

Viewed spatially in FIG. 3, the fingers 51, 52 of both pistons 6, 7 are positioned axially behind each other on the circumference. To save axial construction length of the coupling assembly, it can, however, be provided, that the fingers 51, 52 of the two pistons 6, 7, when viewed spatially, are positioned so as to be entwined within each other axially in the circumferential direction in the same axial plane of the transmission.

Achieved by means of this construction is the fact that the first piston 6 near the pot base moves together with its fingers 52 parallel to the axis in the direction of the pot base 26 upon a pressure impact on it and the disc coupling 2 near the pot base closes by pressing together the associated disc packet 8. Upon a pressure impact of the second piston 7 away from the pot base it together with its fingers 52 moves away from the pot base 26, so that the free action areas of the fingers 52 press together the discs 11, 13 of the disc packet 9 away from the pot base.

Also shown in FIG. 3 is that in this activation assembly 50 the two pressure compensation areas 56 and 57 are so positioned on the sides of the piston 6, 7 near the pot base or away from the pot base, that the pressure areas associated with the two pistons as well as a separating wall between them are formed.

The supply of cooling oil therefore occurs in this activation assembly 50 according to FIG. 3 preferably by separate supply lines, so that the disc packet 8 near the pot base can be supplied with cooling oil from the pressure compensation area 56 via a flow line 54 by moving though radial openings 58 in the inner disc carrier 16.

The cooling oil for the disc packet 9 away from the top base, on the other hand, moves from the pressure compensation area 57 along a flow line 55 through radial openings 59 in the inner disc carrier 16 to the inner and outer discs 11, 13 of the disc coupling 3 away from the pot base.

In a change from the shifting element construction as a transmission coupling according to the execution models of FIGS. 1 to 3, it can alternatively be provided, that at least one of the two shifting elements is constructed as a gear brake. If both shifting elements are constructed as disc brakes, then either their common inner disc carrier is connected torque-free with a transmission housing not depicted here or their separate outer disc carriers are connected torque-free with the transmission housing. If only one of the two shifting elements is constructed as a disc brake, then the outer disc carrier of this disc brake is connected torque-free with the transmission housing. The specialist will be able to integrate the disc carrier that is action-connected with the transmission housing directly into the transmission housing, when necessary.

The transmission itself can be designed, for example, as a step automatic transmission, a continuously variable automatic transmission, an automatic shifting transmission or a double coupling transmission by using at least the assembly of the invention with two shifting elements.

REFERENCE SYMBOLS

1 Activation assembly
2 First friction shifting element, first disc coupling
3 Second friction shifting element, first disc coupling
4 First servo device
5 Second servo device
6 Piston of the first servo device
7 Piston of the second servo device
8 Disc packet of the first disc coupling
9 Disc packet of the second disc coupling
10 Inner discs of the first disc coupling
11 Outer discs of the first disc coupling
12 Inner discs of the second disc coupling
13 Outer discs of the second disc coupling
14 Outer disc carrier of the first disc coupling
15 Outer disc carrier of the second disc coupling
16 Common inner disc carrier
17 Pressure compensation area of the first servo device
18 Pressure compensation area of the second servo device
19 Finger on the first piston
20 Pressure plate on the second piston
21 First radial opening on the inner disc carrier
22 Second radial opening on the inner disc carrier
23 Radial recess on the inner disc carrier for the fingers
24 Flow line to the first disc coupling
25 Flow line to the second disc coupling
26 Pot base of the inner disc carrier
27 Pot space
30 Activation assembly
31 Axial section on the first piston
32 Axial section on the second piston
33 Pressure plate on the first piston
34 Pressure plate on the second piston
35 Axial fingers of the first piston
36 Radial cooling oil opening on the inner disc carrier
37 Radial cooling oil opening on the inner disc carrier
38 Flow line for cooling oil
39 Pressure compensation area on first servo device
40 Pressure compensation area on first servo device
41 Feed for cooling oil in the first pressure compensation area 41
42 Feed for cooling oil in the first pressure compensation area 42

43 Axial opening through inner discs
50 Activation assembly
51 Fingers on first piston
52 Fingers on second piston
53 Radial opening in the inner disc carrier for fingers 51, 52
54 Flow line to the first disc packet
55 Flow line to the second disc line
56 First pressure compensation area
57 Second pressure compensation area
58 First radial opening in the inner disc carrier
59 Second radial opening in the inner disc carrier

The invention claimed is:

1. An assembly (1, 30, 50) for activating first and second friction shifting elements (2, 3) by a pressure, the assembly comprising:

the first friction shifting element (2) comprising a first disc packet (8) with a first servo device (4) associated therewith and the second friction shifting element (3) comprising a second disc packet (9) with a second servo device (5) associated therewith, and each of the first and the second disc packets (8, 9) comprising inner discs (10, 11) and outer discs (12, 13) secured to disc carriers (14, 15), and the first and second disc packets (8, 9) being positioned axially adjacent each other within the transmission;

the inner discs (10, 11) of the first and the second disc packets (8, 9) are supported by a radially outwardly facing surface of a common inner disc carrier (16);

the inner disc carrier (16) comprises a radial pot base (26) and a common annular surface, connected with a periphery of the pot base (26), which supports the inner discs (10, 11) of both the first and the second disc packets (8, 9) and the pot base (26) and the common annular surface form a pot-shaped structure which is axially opened on one end;

the respective first and second servo devices (4, 5) are both located primarily within a pot space (27) defined by the pot-shaped structure of the inner disc carrier (16) as well as at least partially axially adjacent each other and radially inward of the first and the second disc packets (8, 9) of the first and the second friction shifting elements (2, 3);

the first friction shifting element (2) is located adjacent the pot base (26) of the inner disc carrier (16);

the first and the second friction shifting elements (2, 3) are activated individually and independent of each other by the respective first and second servo devices (4, 5);

the inner disc carrier (16), for both of the first and the second friction shifting elements (2, 3), has radial openings (21, 22, 23, 36, 37, 53, 58, 59) distributed on a circumference thereof in an axial area between both the disc packets (8, 9);

the inner discs (11) of the second disc packet (9) of the second friction shifting element (3) has axial openings (43), and the inner disc carrier (16) has axially aligned recesses distributed on the circumference at least in the area of the second disc packet (9) of the second friction shifting element (3);

the axial openings (43) in the inner discs (11) of the second friction shifting element (3) or the recesses in the inner disc carrier (16) forms a penetration area through which axially aligned fingers (35) are guided, the axially aligned fingers are associated with the first servo device (4) of the first friction shifting element (2); and the axial aligned fingers (35) are provided to activate the first friction shifting element (2) and penetrate the axial openings (43) in the inner discs (11) of the second friction shifting element (3).

2. The assembly according to claim 1, wherein each of the first and second servo devices (4, 5) comprises an axially movable piston (6, 7) having one of:

a radially aligned pressure plate (20, 33, 34) whose radial free end facilitates engagement of one of the first and the second disc packets (8, 9) respectively associated with the first and the second servo devices (4, 5) upon activation of the respective first and the second servo devices (4, 5), and several radially aligned fingers (19, 51, 52) positioned on the circumference thereof, and free ends of the several radially aligned fingers facilitates engagement of one of the first and the second disc packets (8, 9) respectively associated with the first and the second servo devices (4, 5) and the radially aligned fingers one of penetrate the radial openings (23, 53) of the inner disc carrier (16) or extend through the axially opened end of the inner disc carrier (16).

3. The assembly according to claim 2, wherein the pressure plate (20, 33, 34) is ring-shaped.

4. The assembly according to claim 1, wherein at least one of the axial openings (43) and the axially aligned recesses in the inner disc carrier (16) are constructed, when viewed in a direction of a circumference, as an interruption of a disc entrainment profile on the inner disc carrier (16) and correspondingly on the inner discs (11) of the second disc packet (9) spaced from the pot base (26).

5. The assembly according to claim 1, wherein:

the first servo device (4) associated with the first friction shifting element (2), near the pot base (26), is positioned at least in part radially inwardly of the first disc packet (8) of the first friction shifting element (2) as well as in part radially inwardly of the disc second packet(9) of the second friction shifting element (3) spaced from the pot base (26);

the first servo device (4) has a pressure plate (33) on the piston (6), which extends through the axially opened end of the inner disc carrier (16) and is one of rigidly connected or action-connected at an outer diameter with the axially aligned fingers (35) which activate the first disc packet (8) of the first friction shifting element (2) upon moving via the axially aligned fingers (35) axially toward the pot base (26) of the inner disc carrier (16);

the second servo device (5) associated with the second friction shifting element(S), spaced from the pot base (26), axially borders the first servo device (4) and is positioned, at least in part, radially inwardly of the second disc packet (9) of the second friction shifting element (3) as well as, at least in part, radially below an axial section (31) of the piston (6) of the first servo device (4); and the second servo device (5) has a pressure plate (34) which overlaps the pressure plate (33) of the piston (6) of the first servo device (4), outside the pot space (27) of the inner disc carrier (16), and activates the second disc packet (9) of the second friction shifting element (3) upon moving axially toward the pot base (26) of the inner disc carrier (16).

6. An assembly (1, 30, 50) for activating first and second friction shifting elements (2, 3) by a pressure, the assembly comprising:

the first friction shifting element (2) comprising a first disc packet (8) with a first servo device (4) associated therewith and the second friction shifting element (3) comprising a second disc packet (9) with a second servo device (5) associated therewith, and each of the first and the second disc packets (8, 9) comprising inner discs (10, 11) and outer discs (12, 13) secured to disc carriers (14, 15), and the first and second disc packets (8, 9) being positioned axially adjacent each other within the transmission;

the inner discs (10, 11) of the first and the second disc packets (8, 9) are supported by a radially outwardly facing surface of a common inner disc carrier (16);

the inner disc carrier (16) comprises a radial pot base (26) and a common annular surface, connected with a periphery of the pot base (26), which supports the inner discs (10, 11) of both the first and the second disc packets (8, 9) and the pot base (26) and the common annular surface form a pot-shaped structure which is axially opened on one end;

the respective first and second servo devices (4, 5) are both located primarily within a pot space (27), defined by the pot-shaped structure of the inner disc carrier (16), as well as at least partially axially adjacent each other and radially inward of the first and the second disc packets (8, 9) of the first and the second friction shifting elements (2, 3);

the first friction shifting element (2) is located adjacent the pot base (26) of the inner disc carrier (16);

the first and the second friction shifting elements (2, 3) are activated individually and independent of each other by the respective first and second servo devices (4, 5);

the common inner disc carrier (16), for both of the first and the second friction shifting elements (2, 3), has radial openings (21, 22, 23, 36, 37, 53, 58, 59) distributed on a circumference thereof, in an axial area between the first and the second disc packets (8, 9);

the first servo device (4), associated with the first friction shifting element (2), is at least primarily positioned radially inwardly of the first disc packet (8) of the first friction shifting element (2);

the second servo device (5), associated with the second friction shifting element (3) spaced from the pot base (26), is at least primarily positioned radially inwardly of the second disc packet (9) of the second friction shifting element (3); and both of the first and the second servo devices (4, 5) have several fingers (51, 52) distributed about a circumference of a respective piston (6, 7), and the several fingers (51, 52) penetrate in a radial direction, one of the radial openings (53) provided in the common annular surface between both the first and the second disc packets (8, 9) and free ends of the several fingers (51, 52) facilitate engagement of the associated first and the second disc packet (8, 9), the first friction shifting element (2) is engaged by a pulling activation of the several fingers (51) of the piston (6) of the first servo device (4) toward the pot base (26) of the inner disc carrier (16); and the second friction shifting element (3) is engaged by a pressing activation of the several fingers (52) of the piston (7) of the second servo device (5) away from the pot base (26) of the inner disc carrier (16).

7. The assembly according to claim 6, wherein at least one of the several finger (51) of the piston (6) of the first servo device (4) and at least one of the several fingers (52) of the piston (7) of the second servo device (5) are associated with each of the radial openings (53) radially distributed about the circumference in an axial area between the first and the second disc packets (8, 9).

8. The assembly according to claim 6, wherein the several fingers (51, 52) of the pistons (6, 7) of both the first and the second servo devices (4, 5) are positioned, when spatially viewed, axially directly adjacent one another.

9. The assembly according to claim 6, wherein the several fingers (51, 52) of the pistons (6, 7) of both the first and the second servo devices (4, 5) are positioned, when spatially viewed, axially interlaced in a direction of the circumference and in a same axial plane of the transmission.

10. The assembly according to claim 6, wherein both of the pistons (6, 7) of the first and the second servo devices (4, 5) are axially positioned immediately adjacent one another.

11. The assembly according to claim 6, wherein at least one of the first servo device (4) and the second servo device (5) has a dynamic activation pressure compensation.

12. The assembly according to claim 11, wherein pressure compensation areas (17, 39, 56; 18, 40, 56), for the dynamic activation pressure compensation of the at least one of the first servo device (4) and the second servo device (5), are positioned axially adjacent to pressure areas of the at least one of the first servo device (4) and the second servo device (5).

13. The assembly according to claim 11, wherein a pressure compensation area (17, 39, 56) associated with the piston (6) of the first servo device is adjacent the pot base (26) of the inner disc carrier (16).

14. The assembly according to claim 11, wherein a pressure compensation area (18), associated with the piston (7) of the second servo device (5) spaced from the pot base (26), is axially positioned between the piston (6) of the first servo device (4) and the piston (7) of the second servo device (5).

15. The assembly according to claim 11, wherein a pressure compensation area (40, 57), associated with the piston (7) of the second servo device (5) is located on an end of the piston (7) of the second servo device (5) opposite the piston (6) of the first servo device (4).

16. The assembly according to claim 11, wherein a pressure compensation area (40, 57) of the second servo device (5) is positioned in the area of an axial edge of the inner disc carrier (16) spaced from the pot base (26).

17. The assembly according to claim 11, wherein pressure compensation areas (17, 39, 56; 18, 40, 56) associated with the pistons (6, 7) of the first and the second servo devices (4, 5) are positioned, when spatially viewed, either to one of axial left or an axial right of the pressure area which is associated with the pistons (6, 7) of the first and the second servo devices (4, 5).

18. The assembly according to claim 11, wherein cooling oil is supplied to the inner and the outer discs (10, 12) of the first friction shifting element (2) which can flow from the pressure compensation area (17, 56) associated with the first friction shifting element (2) via a flow line (24, 54) that is constructed between a radial outer side of the pressure compensation area (17, 56) and a radial inner side of the inner disc carrier (16) and leads through the radial openings (21, 36, 58) in the inner disc carrier (16) which are positioned, when viewed spatially, in the area of the first disc packet (8) of the first friction shifting element (2).

19. The assembly according to claim 11, wherein cooling oil is supplied to the inner and the outer discs (11, 13) of the second friction shifting element (3) which can flow from a pressure compensation area (18, 57) associated with the second friction shifting element (3) via a flow line (25, 55) that is constructed between a radial outer side of the pressure compensation area (18, 57) and a radial inner side of the inner disc carrier (16) and leads through the radial openings (22, 37, 59) in the inner disc carrier (16) which are positioned, when viewed spatially, in the area of the second disc packet (9) of the second friction shifting element (3).

20. The assembly according to claim 11, wherein cooling oil is supplied to the inner and outer discs (10,12; 11, 13) of the first and the second friction shifting elements (2, 3), which can flow from a pressure compensation area (39) associated with the first friction shifting element (2) via a flow line (38) that is constructed between a radial outer side of the pressure compensation area (39) and the radial inner side of the inner disc carrier (16) and leads through the radial openings (36, 37) in the inner disc carrier (16) which are positioned, when spatially viewed, in the area of the first and the second disc packets (8, 9) of the first and the second friction shifting elements (2, 3).

21. An assembly (1, 30, 50) for activating first and second friction shifting elements (2, 3) by a pressure, the assembly comprising:

the first friction shifting element (2) comprising a first disc packet (8) with a first servo device (4) associated therewith and the second friction shifting element (3) comprising a second disc packet (9) with a second servo device (5) associated therewith, and each of the first and the second disc packets (8, 9) comprising inner discs (10, 11) and outer discs (12, 13) secured to disc carriers (14, 15), and the first and second disc packets (8, 9) being positioned axially adjacent each other within the transmission;

the inner discs (10, 11) of the first and the second disc packets (8, 9) are supported by a radially outwardly facing surface of a common inner disc carrier (16);

the inner disc carrier (16) comprises a radial pot base (26) and a common annular surface, connected with a periphery of the pot base (26), which supports the inner discs (10, 11) of both the first and the second disc packets (8, 9) and the pot base (26) and the common annular surface form a pot-shaped structure which is axially opened on one end thereof;

the respective first and second servo devices (4, 5) are both located primarily within a pot space (27), defined by the pot-shaped structure of the inner disc carrier (16), as well as at least partially axially adjacent each other and radially inward of the first and the second disc packets (8, 9) of the first and the second friction shifting elements (2, 3);

the first disc packet (8) is located adjacent the pot base (26) of the inner disc carrier (16);

the first and the second friction shifting elements (2, 3) are activated individually and independent of each other by the respective first and second servo devices (4, 5);

the common inner disc carrier (16), for both of the first and the second disc packets (8, 9), has radial openings (21, 22, 23, 36, 37, 53, 58, 59) distributed on a circumference thereof, in an axial area between the first and the second disc packets (8, 9); and the radial openings (23, 53) in the inner disc carrier (16), which receive fingers (19, 51, 52) supported by at least one respective piston (6, 7) of the first and second servo devices (4, 5) are longer in the axial direction than an axial extent of the fingers (19, 51, 52) plus a gap of the first and the second disc packets (8, 9) of the associated first and second friction shifting elements (2, 3).

22. The assembly according to claim 21, wherein the first servo device (4), associated with the first friction shifting element (2), is located adjacent the pot base (26) and is positioned directly radially inwardly of the first disc packet (8) of the first friction shifting element (2);

the first servo device (4) has fingers which penetrate the radial openings (23, 53) of the inner disc carrier (16), in a radial direction, and activate the first disc packet (8) of the first friction shifting element (2) upon axial movement of the fingers in a direction toward the pot base (26) of the inner disc carrier (16);

the second servo device (5), associated with a second friction shifting element (3), is located directly radially inwardly of the second disc packet (9) of the second friction shifting element (3); and the second servo device (5) has a pressure plate (20) which extends through the axially opened end of the inner disc carrier (16) for engaging the second disc packet (9) of the second friction shifting element (3) upon activation of the second servo device (5).

23. The assembly according to claim 21, wherein the inner discs (10, 11) of both the first and the second friction shifting elements (2, 3) are constructed as lining discs.

24. The assembly according to claim 21, wherein each of the first and second friction shifting elements (2, 3) is a disc coupling.

25. The assembly according to claim 21, wherein both of the first and the second friction shifting elements (2, 3) are gear brakes in which a common inner disc carrier is one of connected, in a slip free manner, with the transmission housing or is integrated into the transmission housing, or in which the outer disc carrier is one of connected with the transmission housing or is integrated into the transmission housing.

26. The assembly according to claim 21, wherein one of the first and the second friction shifting elements (2, 3) is a gear brake, in which an outer disc carrier is connected, in a slip free manner, with one of the transmission housing or is integrated into the transmission housing.

* * * * *